W. G. PRICE.
SLACK ADJUSTER.
APPLICATION FILED OCT. 26, 1912.

1,157,721.

Patented Oct. 26, 1915.

WITNESSES:
J. R. Keller
Robert C. Totten

INVENTOR.
William Gunn Price
By Kay & Totten
attys.

UNITED STATES PATENT OFFICE.

WILLIAM GUNN PRICE, OF NEW CASTLE, PENNSYLVANIA.

SLACK-ADJUSTER.

1,157,721. Specification of Letters Patent. Patented Oct. 26, 1915.

Application filed October 26, 1912. Serial No. 727,872.

*To all whom it may concern:*

Be it known that I, WILLIAM GUNN PRICE, a citizen of the United States, and resident of New Castle, in the county of Lawrence and State of Pennsylvania, have invented a new and useful Improvement in Slack-Adjusters; and I do hereby declare the following to be a full, clear, and exact description thereof.

My invention relates to slack adjusters for railway car trucks, and is particularly concerned with an improvement upon the type of adjuster illustrated in Patent No. 951,577, granted March 8, 1910.

The object of the invention is to provide means for more effectually preventing water or dust from gaining access to the interior of the adjuster mechanism.

As stated in said patent referred to, the invention comprises an automatic turnbuckle and the brake applying mechanism, and my invention consists in providing a packing at the junction of the telescoping sections of said turnbuckle such that in all relative positions of said telescoping members and all relative movements thereof, an effective dam will be provided as a barrier against the entrance of dirt, dust or moisture into the interior of the outer telescoping member, such barrier also preventing the movement of the inner telescoping member from carrying dirt into the exterior member.

Figure 1:
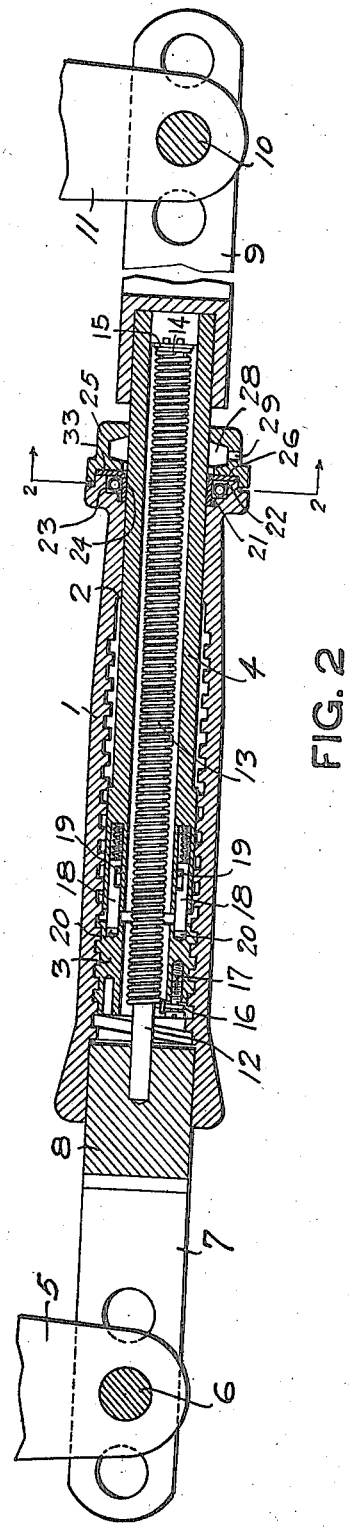
Figure 2:
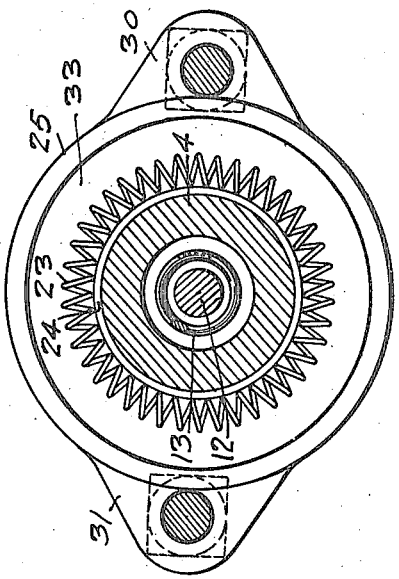

In the accompanying drawings which illustrate an embodiment of my invention, Figure 1 is in part a side elevation, and in part a longitudinal section of a slack adjuster showing the invention; Fig. 2 is a transverse sectional view on the line 2—2 Fig. 1 looking to the right.

The main features of the construction of the adjuster are in all respects the same as those illustrated in said Patent No. 951,577, and consists, generally stated, of an outer tube or sleeve member 1, which is threaded internally from one end up to a shoulder 2, and from thereon is reduced in size, together with a screw block 3, and an internal reciprocating or telescoping member 4 also in the form of a tube. The outer sleeve member is connected to a live brake lever 5 by means of a pin 6 extending through the brake lever and also through a jaw 7. The latter has an extension 8 which is driven into the end of the outer sleeve tightly so as to make a waterproof joint at this point. The internal reciprocating or telescoping member 4 has connected to its outer end a jaw 9 which is connected by the pin 10 to another brake lever 11. Fixed to the inner end of the jaw 7 is a rod 12 on which is mounted a coil spring 13, one end of which is secured in a slot 14 of said rod by the nut 15 and the opposite end of said spring is looped at 16 and engages a screw 17 carried by the screw block 3. At one end of the inner telescoping member or tube 4 is mounted a plurality of spring pins or pawls 18, whose spring projection is limited by pins 19. The screw block 3 is provided with sockets 20 with which these pins 18 are adapted to engage.

In Fig. 1 the adjuster is shown in its shortened condition in which it is ready for connection to the live and dead levers. To put the adjuster in this shortened condition the inner tube 4, before the jaw 9 is affixed thereto, is introduced into the outer tube 1 from the left end of the latter, and is positioned in said outer tube with its inner end near the left end as shown. The screw block 3 with the spring 13 on the rod 12 connected to said block, together with said rod and spring are introduced into the left end of the sleeve 1 and by rotating the jaw 7 before the same is threaded to the sleeve 1, the screw block 3 is brought up into engagement with the pawls 18 in the inner tube 4. The spring 13 is then placed under tension which would tend to screw the screw block 3 farther into the sleeve 1 but any such movement is prevented by the pawls 18. The jaw 7 is then driven into the end of the sleeve 1 and thus fixed in position, said jaw making a water and dust tight joint with the end of said sleeve. In order to effectually prevent the entrance of dust, dirt or water into the opposite or right hand end of the sleeve, as viewed in Fig. 1, this end of the sleeve 1 is provided with an annular recess or rabbet 21 and outside of this is a larger annular recess or rabbet 22. Into this larger recess is introduced a circular coil spring 23 and over the end of the inner tube 4 is slipped a cupped packing sleeve of leather or other suitable packing material 24. The inner end of this packing sleeve is thrust between the spring 23 and the inner tube 4 until its end is seated within the smaller annular recess 21. The packing sleeve 24 is provided with a flange portion 33 which rests against the end of the sleeve 1. A packing ring 25 having a clamping seat 26 is then slipped over the end of the tube 4, and is clamped tight to the sleeve 1 by bolts which pass through the lugs 30 and 31 and corresponding lugs on the sleeve member 1. The outer or flanged portion 33 of the packing washer 24 is compressed by said packing sleeve and thus makes a water tight joint. The depth of the larger annular recess 22 is great enough to allow free play of said spring 23. This circular spring 23 is normally of somewhat less diameter than the external diameter of the inner tube 4, so that in placing said spring over said tube, the former is expanded somewhat and is further expanded by the introduction of the packing sleeve 24 between it and the inner tube so that normally said circular helical spring snugly embraces the packing sleeve and presses same closely against the inner tube. This action serves not only to hold the packing sleeve in water and dust tight engagement with the inner tube when the parts are first assembled and when the packing sleeve is new and flexible, but also serves to take up any wear of the packing sleeve by the movement of the inner tube therethrough and to close the packing sleeve in upon said inner tube notwithstanding the fact that the packing sleeve may have become stiff from exposure to water and dust. In effect, therefore, the spring 23 which backs up the packing sleeve forms a compensating member to cause the packing sleeve to at all times snugly engage the tube. The pressure of the spring 23 on the packing sleeve has the further advantage that when the inner tube 4 moves inwardly into the sleeve 1, this spring will hold the portion of the packing sleeve upon which it rests firmly against the tube and serve to scrape back any moisture or dirt which may rest on the inner tube outside of the packing sleeve.

The packing ring 25 is provided with an annular chamber 28 which serves to carry off moisture or dust which may enter between the outer end of said packing ring and the inner tube 4, and said chamber is provided at the bottom with outlet 29 to discharge such moisture and dirt as may gain access to said chamber.

When the brakes are applied, the inner end of the tube member 4 is forced into contact with the screw block 3 and when the brakes are released, the tube member 4 is pulled in direction out of the sleeve 1 and away from the screw block 3 a distance nearly and sometimes equal to the length of the projecting pawls 18. The tube member 4 thus has a reciprocating movement out and into the sleeve 1 and through the packing ring 25. When the tube member 4 is in its outward position mud and grit and water from the street collect on its exposed surface and then as the tube member 4 is moved in through the packing ring 25 by the pressure of the brake application, some of the mud is also carried in but it is carried in only as far as the tube member 4 moves in, and as the length of this movement is always less than the width of the annular chamber 28 the mud does not reach the packing sleeve 24. Owing to the annular chamber 28 there is nothing in contact with the tube member 4 for a space equal to the width of the chamber 28 so by the reciprocating movement of the tube 4 mud is not scraped or rubbed along to and against and then through the packing sleeve 24 and the packing is thus not cut and worn out by the grit which without this device will get under it. I have found after many tests of long duration that the cup packing device and the annular chamber device when either one is used separately are successful to a certain degree for preventing mud and water from passing on into the sleeve member 1 but that the combination of the two devices, cupped packing and annular chamber with outlet is perfectly successful and durable under all conditions and enables me to furnish a brake slack adjuster which will not fill up with mud and thus fail to operate.

While I have herein described the particular embodiment of my invention, it is understood that the same may be altered in details, arrangement of parts and specific application within the scope of the appended claims.

What I claim is:

1. A packing device for telescoping members comprising an outer telescoping member having an annular recess within the end receiving the inner member, a packing ring of flexible material having a tubular portion carried in said recess and surrounding said inner telescoping member, a circular helical spring surrounding said tubular portion and normally compressing the same against said inner member throughout its circumference, said packing member having an annular expanded flange adapted to overlie said recess, said spring and the end of said outer member, a packing ring engaging said outer member, and adapted to clamp said flange between itself and the end of said outer member.

2. A packing device for telescoping members comprising an outer telescoping member having an annular recess within its end receiving the inner telescoping member, a packing ring of flexible material having a portion lying within said recess and closely embracing said inner member, a resilient member within said recess embracing said portion of said packing member, and normally compressing the same around said inner member, said packing member having an expanded portion overlying said recess and said resilient member, and means for clamping said expanded portion against the end of the said outer member, said clamping member having an annular chamber surrounding said inner member and having a discharge port for said chamber.

3. A packing device for telescoping members comprising an outer telescoping member having an annular recess in the end receiving the inner telescoping member, a packing ring of flexible material having a tubular portion extending into said recess and surrounding said inner member, a circular helical spring surrounding said tubular portion and normally compressing the same against said inner member throughout its circumference, said packing member having an annular expanded flange adapted to overlie said recess, said spring and the end of said outer member, a packing ring engaging said outer member, and adapted to clamp said flange between itself and the end of said outer member, said clamping ring having an annular chamber surrounding said inner member and having a discharge port for said chamber.

In testimony whereof, I the said WILLIAM GUNN PRICE have hereunto set my hand.

WILLIAM GUNN PRICE.

Witnesses:
ROBERT C. TOTTEN,
JOHN F. WILL.